Patented Oct. 4, 1927.

1,643,950

UNITED STATES PATENT OFFICE.

ALBERT LEO, OF CHICAGO, ILLINOIS, AND HERBERT T. LEO, OF CORONA, CALIFORNIA.

FOOD COMPOSITION.

No Drawing.    Application filed February 1, 1926. Serial No. 85,383.

This invention relates to a food composition and more particularly to a composition comprising albumen and pectin for use in making meringues, marshmallows and the like.

Hitherto albumen has been used almost exclusively in the manufacture of maringues, marshmallows and like articles of food. The usual method of making meringues is to beat up the whites of eggs until sufficient air has been incorporated to form a stiff whip. Formerly fresh eggs were used, but in recent years dried egg albumen has largely taken their place. In using the dry albumen, it is necessary to add sufficient water to make up the loss in water content which occurs in the drying process. As a consequence of the introduction of dried albumen, a great many preparations have been placed on the market containing a greater or less amount of albumen, each serving its purpose, but all of them dependent upon the albumen to produce the whip effect.

In general, such preparations contain approximately fifty per cent egg albumen and are used in recipes of which the following is representative:

1 pint water, 2½ ounces of the albumen preparation, and 1½ pounds of sugar. The albumen is relied upon to produce the whip effect desired. One of the undesirable properties of such an albumen preparation is the unstableness of the whip produced therefrom. After standing thirty-six hours, the usual egg albumen whip tends to go back to a fluid condition, thereby rendering it worthless for the purpose intended.

It is therefore an object of this invention to provide a food composition for making meringues, marshmallows, and the like, which comprises albumen and a pectin containing substance together with a suitable fruit acid, the pectin-acid mixture being adapted to render the whip produced therefrom comparatively stable and of greater volume than whips made from an equal quantity of albumen alone.

It is a further object of this invention to provide a pectin albumen composition for use in making meringues and the like, which is more satisfactory and more economical for the purpose.

Other and further important objects of this invention will be apparent from the disclosures in the specification and appended claims.

We have found that although a finished jelly preparation of pectin, sugar, water and acid cannot be beaten into a froth by itself, it will, when incorporated into an albumen composition, produce a very voluminous and stable whip. A small amount of egg albumen is first beaten into a froth and a jelly preparation of the above ingredients in proper proportions is then gradually poured into the froth. In this way the mass of whip is greatly enlarged and the finished whip is both stable and satisfactory.

We have also found that by incorporating all of the ingredients in dry form, with the exception of a part of the sugar ultimately required, we can prepare a readily marketable compound that will give excellent results. This compound consists of a small proportion of dried egg or blood albumen, powdered or finely divided sugar or dextrose, pectin, and a suitable fruit acid.

Our preferred composition is substantially as follows:

|  | Per cent. |
|---|---|
| Dried egg albumen | 20 |
| Citrus pectin | 5 |
| Citric acid | 2 |
| Sugar | 73 |

The pectin used in the above composition is assumed to be a standardized grade, one pound of which is adapted to jelly one hundred pounds of sugar. In place of citric acid, other fruit acids such as malic or tartaric may be used with satisfactory results. The acid present aids in the formation of a jelly.

The method of preparing the whip from the above composition is substantially as follows: To one pint of cold water in the whip bowl, add 2½ ounces approximately, of the composition and whip until stiff; then add 1½ pounds of sugar and continue beating until the sugar is entirely dissolved or incorporated throughout the mass.

The proportion of pectin, acid, sugar and water in the final whip are such as will ordinarily produce a jelly, but the proportion of ingredients as given may be varied depending upon the strength of the albumen and of the pectin.

We are aware that many changes may be made, and numerous details of the process may be varied through a wide range without departing from the principles of this invention, and we therefore do not purpose limiting the patent granted hereon otherwise than necessitated by the prior art.

We claim as our invention:

1. A food composition for use in making meringues, marshmallows and the like, comprising albumen and pectin.

2. A pectin meringue composition containing less than the usual percentage of egg albumen necessary to produce a whip, the deficiency in albumen being made up by the pectin in the composition.

3. A stable meringue whip comprising albumen and a pectin containing substance.

4. A food composition for use in making meringues and the like comprising albumen and a jelly preparation containing pectin and an edible fruit acid.

5. A food composition for use in making meringues comprising egg albumen and a preparation of pectin, sugar and a suitable acid, the ingredients of said preparation all being in the proportions necessary to form a jelly.

In testimony whereof we have hereunto subscribed our names.

ALBERT LEO.
HERBERT T. LEO.